United States Patent
Fukui et al.

(10) Patent No.: US 7,830,828 B2
(45) Date of Patent: Nov. 9, 2010

(54) COMMUNICATION APPARATUS, COMMUNICATION SYSTEM AND COMMUNICATION METHOD

(75) Inventors: Akito Fukui, Kanagawa (JP); Kenichiro Iida, Kanagawa (JP); Takeshi Kanazawa, Kanagawa (JP); Tomofumi Tamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 674 days.

(21) Appl. No.: 11/813,016

(22) PCT Filed: Dec. 27, 2005

(86) PCT No.: PCT/JP2005/023972

§ 371 (c)(1),
(2), (4) Date: Jun. 28, 2007

(87) PCT Pub. No.: WO2006/073100

PCT Pub. Date: Jul. 13, 2006

(65) Prior Publication Data

US 2008/0101243 A1 May 1, 2008

(30) Foreign Application Priority Data

Jan. 5, 2005 (JP) ............................. 2005-000607

(51) Int. Cl.
*H04L 1/00* (2006.01)
(52) U.S. Cl. ...................................... 370/312; 370/238
(58) Field of Classification Search ................. 370/238, 370/312, 331, 329, 352, 389
See application file for complete search history.

(56) References Cited

U.S. PATENT DOCUMENTS 5,781,547 A * 7/1998 Wilson ....................... 370/352
7,113,480 B2 9/2006 Kato

FOREIGN PATENT DOCUMENTS

EP 1 353 520 10/2003
EP 1 359 774 11/2003

(Continued)

OTHER PUBLICATIONS

PCT International Search Report dated Apr. 11, 2006.

(Continued)

*Primary Examiner*—Sam Bhattacharya
(74) *Attorney, Agent, or Firm*—Dickinson Wright PLLC (57) ABSTRACT

A communication apparatus wherein the function arrangement of each device is revised, thereby preventing an increase in traffic of a public network and further suppressing an increase in communication cost of the public network. In this apparatus, a control part (101), when notified of a duplication of MBMS data by RNC-c, controls a PDCP part (102), an RLC part (103) and a MAC-d part (104) so as to perform an MBMS data duplication process. The control part (101), when notified of an establishment of a communication line with a node (B), controls the PDCP part (102), RLC part (103) and MAC-d part (104) so as to establish the communication line with the node (B). The RLC part (103) duplicates, based on the control by the control part (101), the MBMS data received from the PDCP part (102). The MAC-d part (104) transmits the MBMS data as MAC processed to the node (B) via a local network between an RNC-u (100) and the node (B).

6 Claims, 8 Drawing Sheets

FOREIGN PATENT DOCUMENTS

| | | |
|---|---|---|
| JP | 2004048209 | 2/2004 |
| WO | 2004/071117 | 8/2004 |
| WO | 2004/102831 | 11/2004 |

OTHER PUBLICATIONS

Motorola, "MBMS Iub considerations," 3GPP TSG-RAN3 Meeting #37, R3-031118, [online ], Aug. 2003, Retrieved from the Internet: <URL:http://www.3gpp.org/ftp/tsg_ran/WG3_Iu/TSGR3_37/Docs/R3-031118.zip> [Retrieved on Apr. 4, 2006.

3rd Generation Partnership Project, Technical Specification Group Services and Aspects; Multimedia Broadcast/Multicast Services (MBMS); Architecture and functional description (Release 6), 3GPP TS 23.246 V.6.4.0, [online], Sep. 2004, Retrieved from the Internet: <URL:http://www.3gpp.org/ftp/Specs/archive/23_series/23.246/23246-640.zip> [Retrieved on Apr. 4, 2006.

3GPP TS23.246 v.6.2.0, Mar. 2004, 3rd Generation Partnership Project; Technical Specification Group Services and System Aspects; Multimedia Broadcast/Multicast Services (MBMS); Architecture and functional description (Release 6), pp. 1-40.

Supplementary European Search Report dated Apr. 12, 2010.

\* cited by examiner

COMMUNICATION APPARATUS, COMMUNICATION SYSTEM AND COMMUNICATION METHOD

TECHNICAL FIELD

The present invention relates to a communication apparatus, communication system and communication method. More particularly, the present invention relates to a communication apparatus, communication system and communication method that provide multicast packet communication services.

BACKGROUND ART

Figure 1:
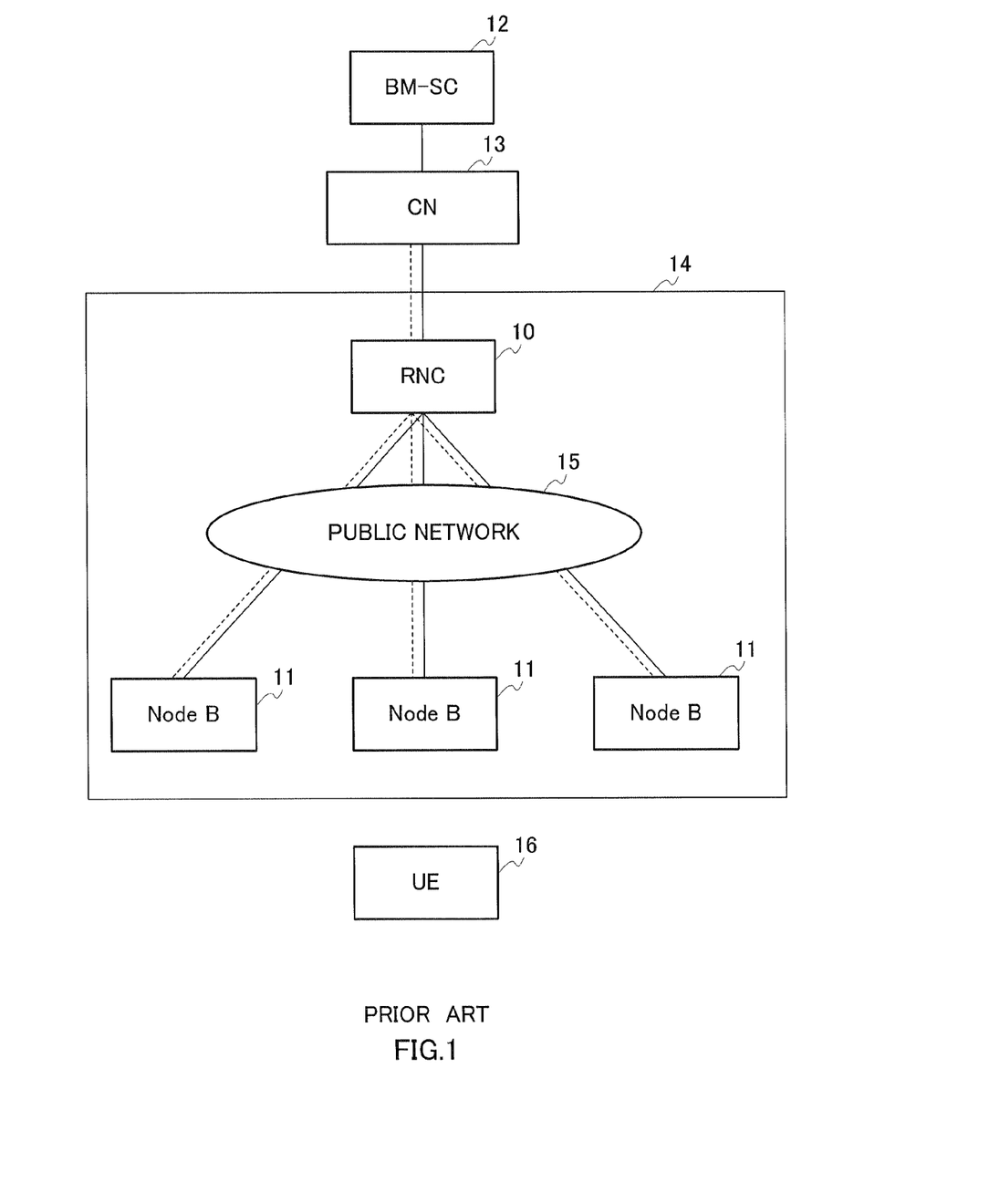
FIG. 1 is a schematic view showing the configuration of a conventional packet communication system.

FIG. 1 is a view showing the configuration of a packet communication system that provides multicast packet communication services (Multimedia Broadcast/Multicast Services) (hereinafter referred to as "MBMS"). In MBMS, control station apparatus (hereinafter referred to as "RNC") 10 duplicates MBMS data and transfers the result to base station apparatuses (hereinafter referred to as "Node B") 11. In FIG. 1, the solid line shows the signal flow in the user plane (hereinafter referred to as "U-plane"), and the dotted line shows the signal flow in the control plane (hereinafter referred to as "C-plane").

Service center (Broadcast/Multicast Service Center) (hereinafter referred to as "BM-SC") 12 provides MBMS. Core network (hereinafter referred to as "CN") 13 is comprised of a GGSN (Gateway GPRS Support Node) and an SGSN (Serving GPRS Support Node), which are not illustrated. GGSN performs the setup (i.e. setup for the bearer plane) for transporting MBMS data to and from the SGSN, in accordance with commands from BM-SC 12. SGSN carries out MBMS control for each user (including MBMS multicast service activation, MBMS session start, MBMS registration, MBMS session stop), and transmits MBMS data to radio access network (hereinafter referred to as "RAN") 14. RAN 14 is composed of RNC 10, Node B 11, and public network 15. To allow efficient transmission of MBMS data, RNC 10 duplicates MBMS data and transmits the result to each Node B 11. Each Node B 11 transmits the received MBMS data to a radio interface. Public network 15 is used to transmit data between RNC 10 and Node B 11. Terminal apparatus (User Equipment) (hereinafter referred to as "UE") 16 performs MBMS bearer service control, and receives MBMS data.

Non-Patent Document 1: 3GPP TS 23.246 V.6.2.0 (2004-03) Multimedia Broadcast/Multicast Service (MBMS); Architecture and Functional Description (Release 6)

DISCLOSURE OF INVENTION

PROBLEMS TO BE SOLVED BY THE INVENTION

However, conventionally, there is a problem that since MBMS data of the same content duplicated by the RNC is transmitted by using the public network, the traffic in the public network increases, and the communication cost of the public network increases.

It is therefore an object of the present invention to provide a communication apparatus, communication system and communication method for preventing traffic increase in the public network and increase in communication cost in the public network by redoing function allocation to apparatuses.

MEANS FOR SOLVING THE PROBLEM

The communication apparatus of the present invention adopts a configuration having: a receiving section that receives packet data to be transmitted to a plurality of slave base station apparatuses, from a public network; a control section that determines whether a notice regarding duplication of the packet data is received; a duplicating section that duplicates the packet data received at the receiving section if the control section determines that the notice is received; and a transmitting section that transmits the packet data duplicated at the duplicating section to a base station apparatuses, by a local network built in a predetermined area.

The communication system of the present invention adopts a configuration having: an upper station apparatus that duplicates packet data received via a public network and transmits the duplicated packet data by a local network built in a predetermined area; a plurality of base station apparatuses that receive the packet data transmitted from the upper station apparatus, via the local network, and transmit the received packet data by a radio channel; and a mobile terminal apparatus that receives the packet data transmitted from the base station apparatuses, via the radio channel.

The communication method of the present invention provides the steps of: receiving packet data at an upper station apparatus, via a public network; duplicating the packet data at the upper station apparatus that received the packet data; transmitting the duplicated packet data from the upper station apparatus to a plurality of base station apparatuses, by a local network built in a predetermined area; receiving at a base station apparatus the packet data transmitted from the upper station apparatus, by the local network; transmitting the received packet data from the base station apparatuses to a terminal apparatus by a radio channel; and receiving the packet data transmitted from the base station apparatuses at the terminal apparatus via the radio channel.

ADVANTAGEOUS EFFECTS OF THE INVENTION

The present invention makes it possible to prevent traffic increase in the public network and increase in communication cost in the public network, by redoing function allocation to apparatuses.

BEST MODE FOR CARRYING OUT THE INVENTION

Next, embodiments of the present invention will be described in detail, with reference to the accompanying drawings.

EMBODIMENT 1

Figure 2:
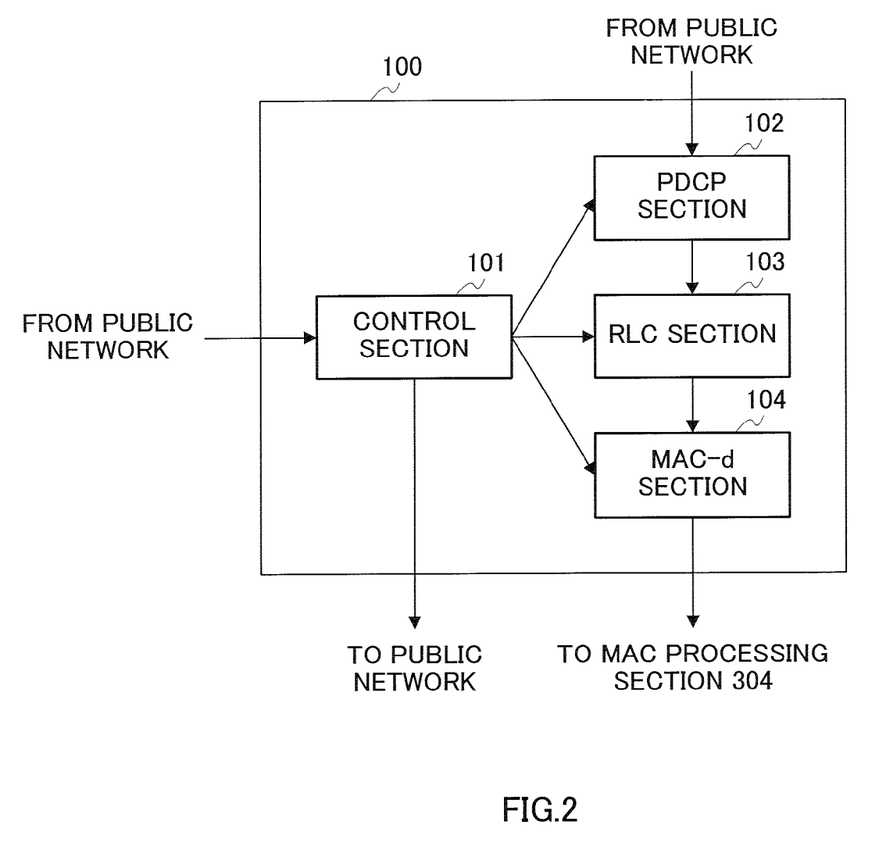
FIG. 2 is a block diagram showing a configuration of RNC-u, according to embodiment 1 of the present invention.

FIG. 2 is a block diagram showing a configuration of RNC-u 100, which is a communication apparatus according to embodiment 1 of the present invention. In embodiment 1 of the present invention, RNC which is an upper station apparatus, is divided into an RNC-c (first upper station apparatus) to which mainly the C-plane functions of the RNC are allocated, and an RNC-u (second upper station apparatus) to which mainly the U-plane functions of the RNC are allocated. RNC-u 100 in FIG. 2 are allocated mainly the U-plane functions of the RNC.

Control section 101 carries out control between RNC-u 100 and an RNC-c (described later). Specifically, control section 101 controls PDCP section 102, RLC section 103 and MAC-d section 104, based on control signals and information about the radio resource control result received from the RNC-c and received via the public network. Also, when control section 101 receives a notice regarding duplication of MBMS data from RNC-c, control section 101 controls PDCP section 102, RLC section 103 and MAC-d section 104 to perform a MBMS data duplication process. Also, when control section 101 receives a notice regarding establishment of a channel with a Node B, control section 101 controls PDCP section 102, RLC section 103 and MAC-d section 104, to establish a channel with the Node B. Also, when control section 101 receives a notice regarding MBMS data duplication process or establishment of a channel with the Node B, control section 101 transmits a response signal to the RNC-c, via the public network. Then, control section 101 outputs the information on the radio resource control results to MAC-d section 104.

Based on the control from control section 101, PDCP section 102 performs IP header compression and the like, on the MBMS data transmitted from a CN (not shown) and received via the public network, in accordance with the packet protocol of radio layer 2, and outputs the result to RLC section 103.

RLC section 103, which is a duplicating means, duplicates the MBMS data inputted from PDCP section 102, based on the control from control section 101. Then, RLC section 103 outputs the duplicated MBMS data to MAC-d section 104.

MAC-d section 104 establishes a channel with the Node B, based on the control from control section 101. Also, based on the control from control section 101, MAC-d section 104 performs MAC processing of the dedicated channel, on the MBMS data inputted from RLC section 103, in accordance with the MAC protocol of radio layer 2. Then, MAC-d section 104 transmits the MAC-processed MBMS data to the Node B, via a local network. Also, MAC-d section 104 transmits information about the radio resource control result inputted from control section 101, to the Node B, via the local network. Here, the local network represents a network built in a predetermined area, such as a private LAN (local area network).

Figure 3:
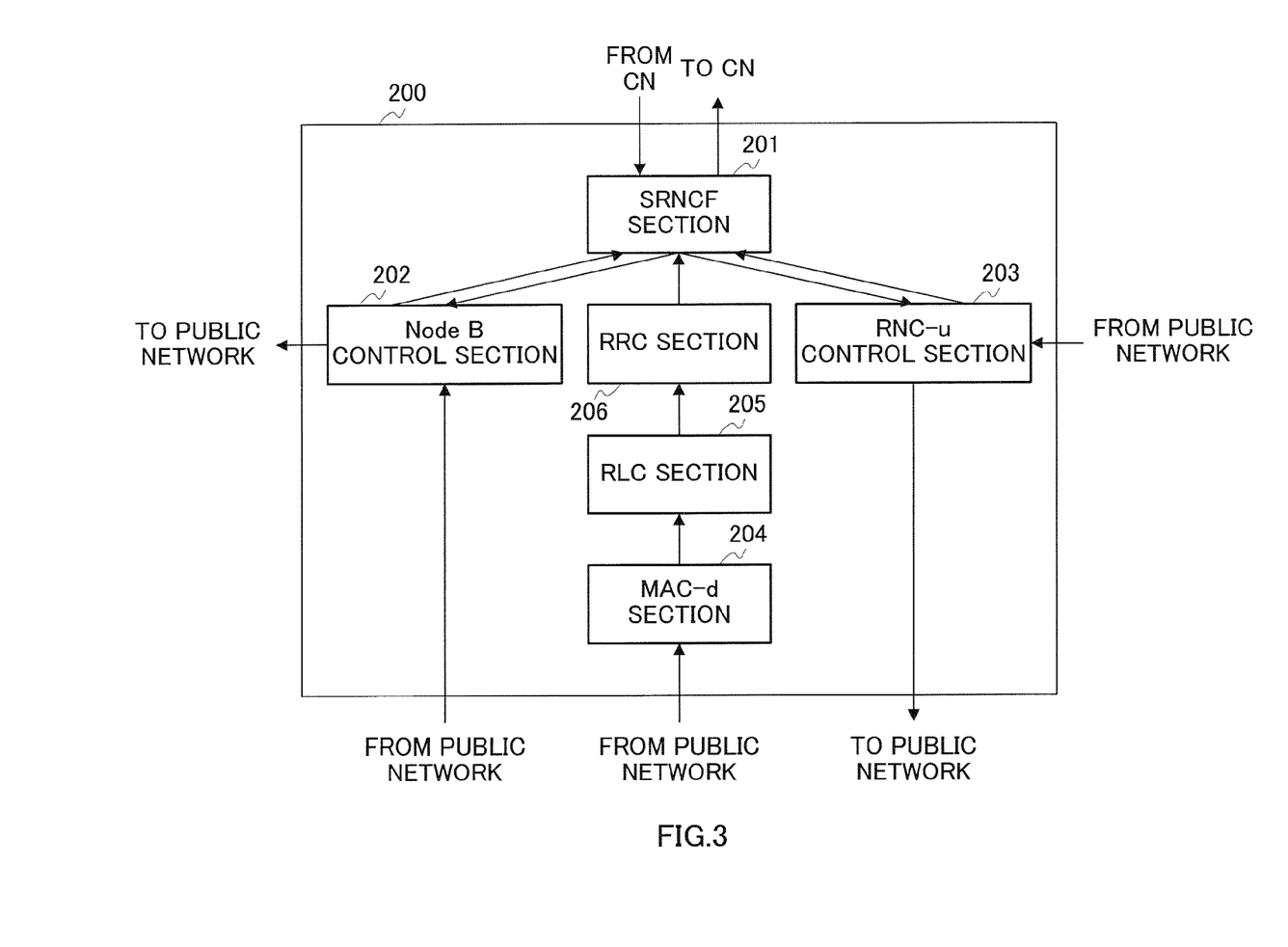
FIG. 3 is a block diagram showing a configuration of RNC-c, according to embodiment 1 of the present invention.

Next, the configuration of RNC-c 200 will be described using FIG. 3. FIG. 3 is a block diagram showing a configuration of RNC-c 200. RNC-c 200 of FIG. 3 is an entity where mainly the C-plane functions of the RNC are allocated.

SRNCF section 201 has a control function of the serving RNC in the conventional RNC. More specifically, SRNCF section 201 outputs a control signal, such as a handover command, etc. for controlling each UE, to Node B control section 202, based on the control signal received from a CN (not shown), and also outputs a control signal for controlling RNC-u 100, to RNC-u control section 203. Also, upon determining that RNC-u 100 is selected by the Node B from RNC-c selection information inputted from Node B control section 202 for selection of the RNC-c, SRNCF section 201 selects RNC-u 100 for the communicating party of the Node B that transmits duplicated packet data to the Node B, based on the communication environment, using, for example, information about the RNC-u processing condition inputted from RNC-u control section 203 or information about the amount of delay between Node B 300 and RNC-u 100. Then, SRNCF section 201 outputs the RNC-u selection information, which is information about the selected RNC-u 100, to RNC-u control section 203. Also, in the case that a request signal for establishment of a control channel with the UE is inputted from RRC section 206, SRNCF section 201 commands RNC-u control section 203 to establish a control channel between the selected RNC-u 100 and the Node B. SRNCF section 201 outputs the information on the radio resource control result inputted from RRC section 206, to RNC-u control section 203.

Node B control section 202 is adapted to perform control between RNC-c 200 and the Node B, and it is possible to apply the RNSAP of 3GPP TS25.423. Node B control section 202 transmits control signals to the Node B via the public network, and receives control signals transmitted from the Node B via the public network. Also, Node B control section 202 outputs RNC-c selection information, which is received from the Node B via the public network and which is about the RNC-c selected by the Node B, to SRNCF section 201. Node B control section 202 transmits information about the communication environment, using, for example, information about the MBMS processing condition of RNC-c 200 or information about the amount of delay between Node B 300 and RNC-c 200, to the public network, to thus transmit that to the Node B.

RNC-u control section 203 carries out control between RNC-u 100 and RNC-c 200. More specifically, RNC-u control section 203 transmits the control signals inputted from SRNCF section 201, to RNC-u 100, via the public network. Also, from the RNC-u selection information inputted from SRNCF section 201, RNC-u control section 203 tells the selected RNC-u 100, via the public network, to perform a MBMS data duplication process. When RNC-u control section 203 is commanded by SRNCF section 201 to establish a channel with the Node B and transmit MBMS data, RNC-u control section 203 tells the selected RNC-u 100, via the public network, to establish a channel between the selected RNC-u 100 and the Node B. RNC-u control section 203 transmits the information about the radio resource control result inputted from SRNCF section 201, to RNC-u 100, via the public network.

MAC-d section 204 receives the request signal for channel establishment for controlling the UE, from the Node B, via the public network. Then, MAC-d section 204 performs MAC processing for the dedicated channel, on the received request signal for channel establishment, in accordance with the MAC protocol of radio layer 2, and outputs the result to RLC section 205.

RLC section 205 performs retransmission control on the MAC-processed request signal for channel establishment inputted from MAC-d section 204, in accordance with the retransmission protocol of radio layer 2. Then, RLC section 205 outputs the retransmission control result to RRC section 206.

RRC section 206 performs radio resource control on the retransmission control result inputted from RLC section 205. Then, RRC section 206 outputs information about the request signal for establishing a control channel with the UE after radio resource control, and the radio resource control result, to SRNCF section 201.

Figure 4:
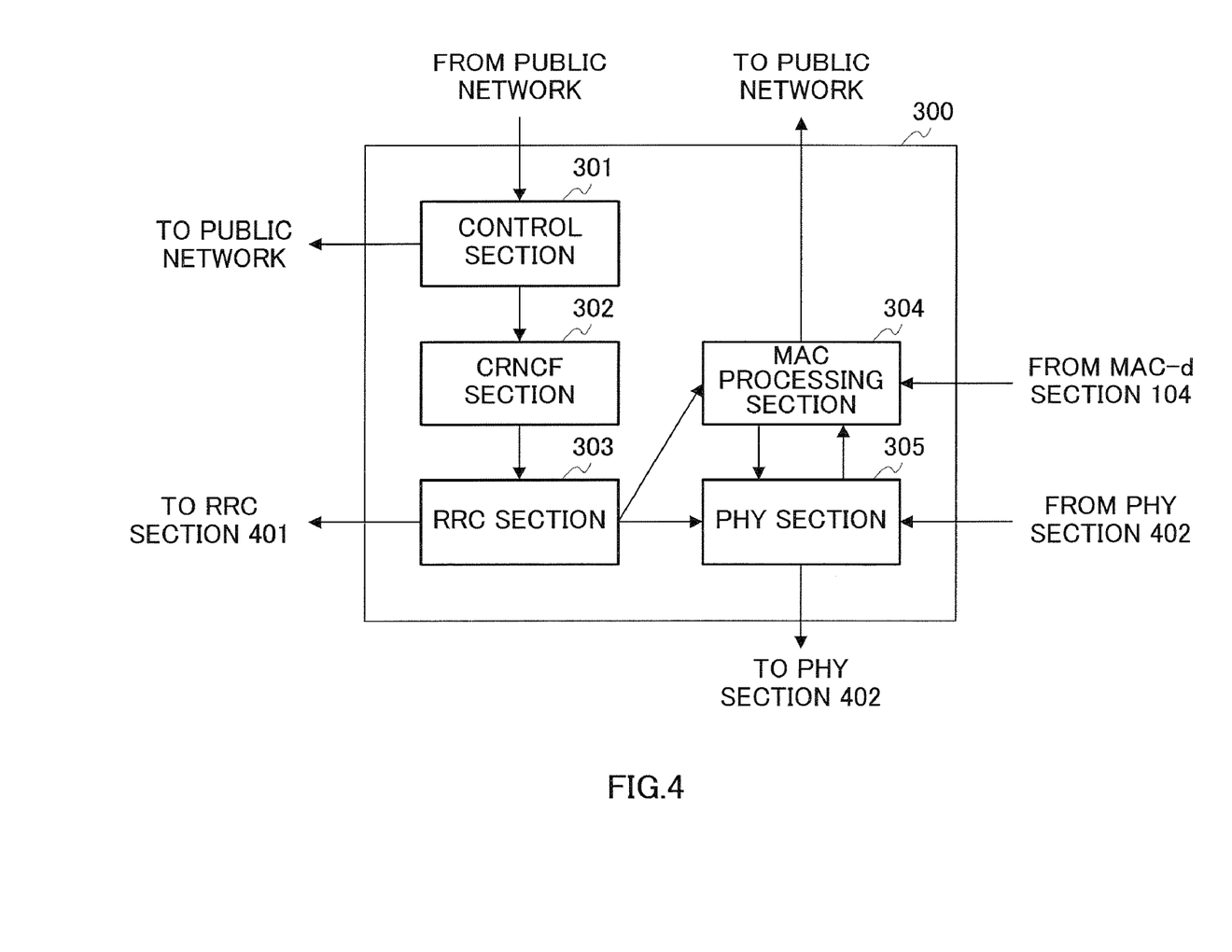
FIG. 4 is a block diagram showing a configuration of a Node B, according to embodiment 1 of the present invention.

Next, the configuration of Node B 300 will be described using FIG. 4. FIG. 4 is a block diagram showing the configuration of Node B 300.

Control section 301 performs control between RNC-c 200 and Node B 300. More specifically, control section 301 selects RNC-c 200, based on information about the communication environment. using, for example, information about the MBMS data processing condition of RNC-c 200 or information about the delay amount between Node B 300 and RNC-c 200 transmitted from Node B control section 202 and received via the public network. Then, control section 301 commands CRNCF section 302 to transmit the request signal for establishing a channel, to the selected RNC-c 200, and transmits RNC-c 200 selection information of the selected RNC-c 200, to RNC-c 200, via the public network.

CRNCF section 302 has the control function of the controlling RNC in the conventional RNC. More specifically, in the case that CRNCF section 302 is commanded by control section 301 to transmit a request signal for channel establishment to the selected RNC-c 200, CRNCF section 302 performs control of radio cell units, using, for example, information about the availability of each cell and information about the codes in use. Then, CRNCF section 302 outputs the control result to RRC section 303.

RRC section 303 performs radio resource control, using the control results inputted from CRNCF section 302. Then, RRC section 303 controls MAC processing section 304 and PHY section 305, based on the radio resource control result. Also, RRC section 303 transmits the information about the radio resource control result to the UE.

When a request signal for channel establishment is inputted from PHY section 305, MAC processing section 304 performs MAC processing on the common channel, based on the control from RRC section 303, in accordance with the MAC protocol of radio layer 2, and transmits the request signal for channel establishment to the selected RNC-c 200, via the public network. Also, based on the control from RRC section 303 MAC processing section 304 receives the MBMS data transmitted from MAC-d section 104 of RNC-u 100, via a local network. Then, MAC processing section 304 outputs the MBMS data to PHY section 305. Also, MAC processing section 304 outputs information about the radio resource control result transmitted from RNC-u 100 and received via the local network, to PHY section 305.

Based on the control from RRC section 303, PHY section 305 performs modulation and demodulation, and the like, of the MBMS data inputted from MAC processing section 304, for radio-transmission it, in accordance with physical layer protocol of radio layer 1, and outputs the result to the UE by a radio channel. Also, PHY section 305 receives the request signal for channel establishment, received from the UE, and outputs the signal to MAC processing section 304. PHY section 305 performs modulation, and the like, of the information about the radio resource control result inputted from MAC processing section 304, and transmits the result to the UE by a radio channel.

Figure 5:
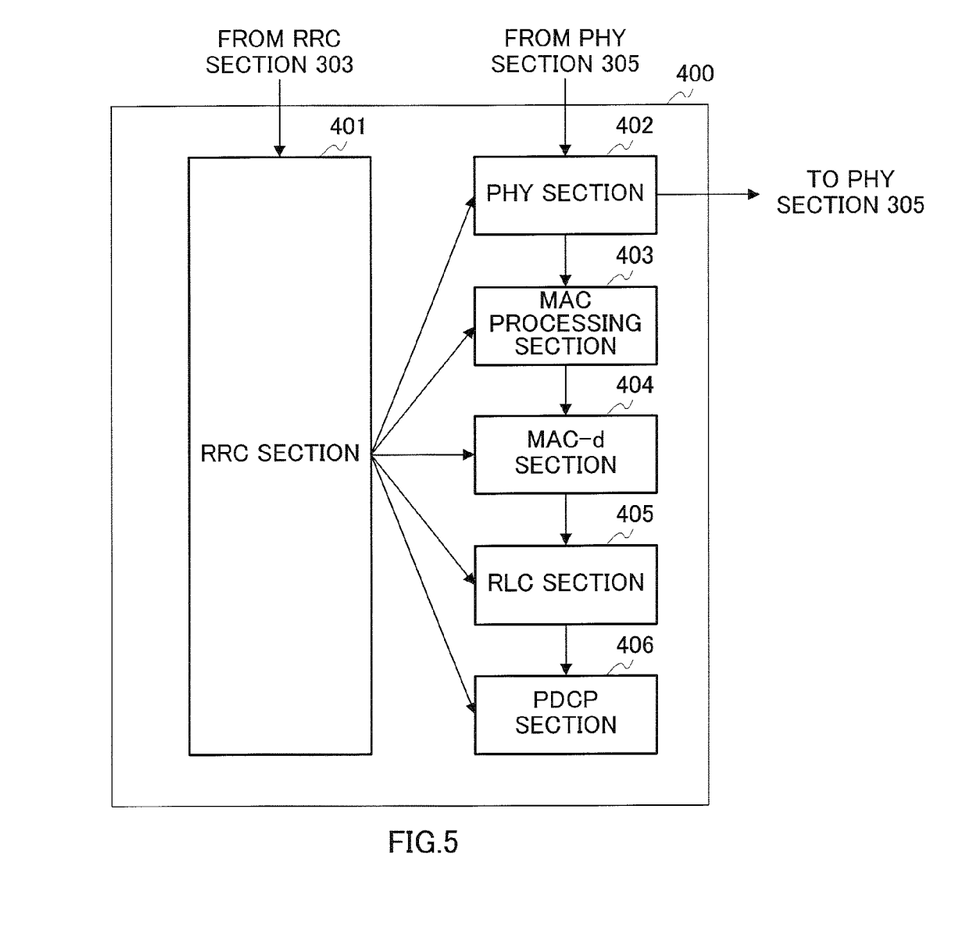
FIG. 5 is a block diagram showing a configuration of UE, according to embodiment 1 of the present invention.

Next, the configuration of UE 400 will be described using FIG. 5. FIG. 5 is a block diagram showing the configuration of UE 400.

RRC section 401 controls MAC processing section 403, MAC-d section 404, RLC section 405 and PDCP section 406, based on information about the radio resource control result received from RRC section 303 of Node B 300. Also, when RRC section 401 starts communication, outputs the request signal for channel establishment, to PHY section 402.

PHY section 402 performs demodulation, and the like, of the MBMS data received from PHY section 305 of Node B 300, in accordance with the physical layer protocol of radio layer 1, and outputs the result to MAC processing section 403. Also, when a request signal for channel establishment is inputted from RRC section 401, PHY section 402 transmits the request signal for channel establishment, to PHY section 305 of Node B 300.

MAC processing section 403 performs MAC processing of the common channel, on the MBMS data inputted from PHY section 402, in accordance with the MAC protocol of radio layer 2. Then, MAC processing section 403 outputs the MAC-processed MBMS data to MAC-d section 404.

MAC-d section 404 performs MAC processing of the dedicated channel, on the MBMS data inputted from MAC processing section 403, in accordance with the MAC protocol of radio layer 2. Then, MAC-d section 404 outputs the MAC-processed MBMS data to RLC section 405.

RLC section 405 processes the MBMS data inputted from MAC-d section 404, in accordance with the retransmission protocol of radio layer 2, and outputs the result to PDCP section 406.

PDCP section 406 processes the MBMS data inputted from RLC section 405, in accordance with the packet protocol of radio layer 2.

Figure 6:
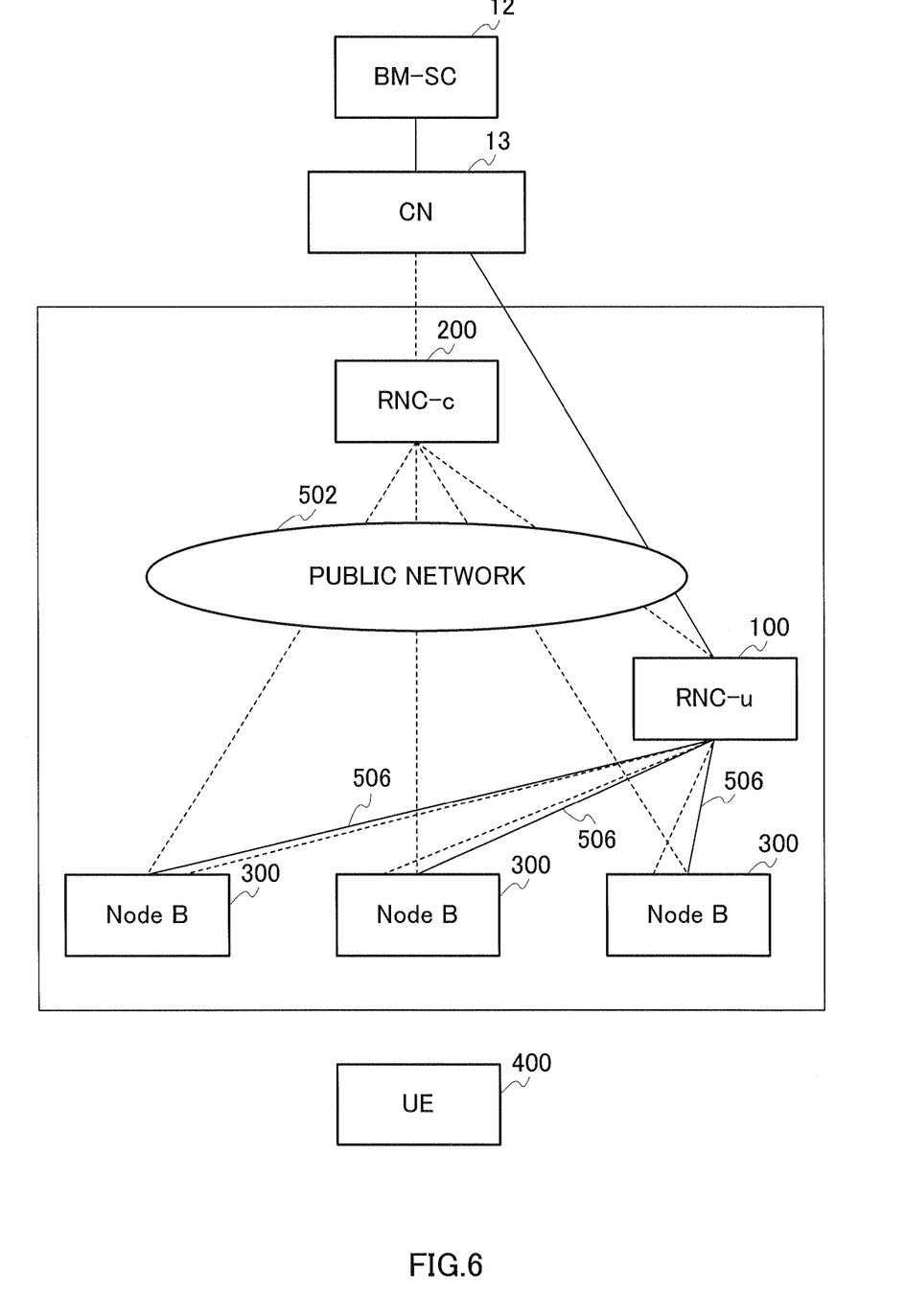
FIG. 6 is a schematic diagram showing a configuration of a packet communication system, according to embodiment 1 of the present invention.

Next, the function allocation of the RNC and Node B will be described using FIG. 6. FIG. 6 is a schematic view showing a packet communication system which employs RNC-u 100, RNC-c 200, Node B 300 and UE 400. In FIG. 6, the broken lines show control signal channels and the solid lines show MBMS data channels.

The packet communication system shown in FIG. 6 is configured by dividing the functions of the RNC into RNC-c 200, to which mainly the C-plane functions of the RNC are allocated, and RNC-c 200, to which mainly the U-plane functions of the RNC are allocated, and allocating part of the functions of the RNC to Node B 300. The MBMS data from CN13 is not duplicated upstream of public network 502, but is duplicated in RNC-u 100, which is provided downstream of public network 502, and is distributed to slave Nodes B 300. In FIG. 6, RNC-c 200 has the same configuration as that shown in FIG. 3, RNC-u 100 has the same configuration as that shown in FIG. 2, and Nodes B 300 have the same configuration as that shown in FIG. 4.

Figure 7:
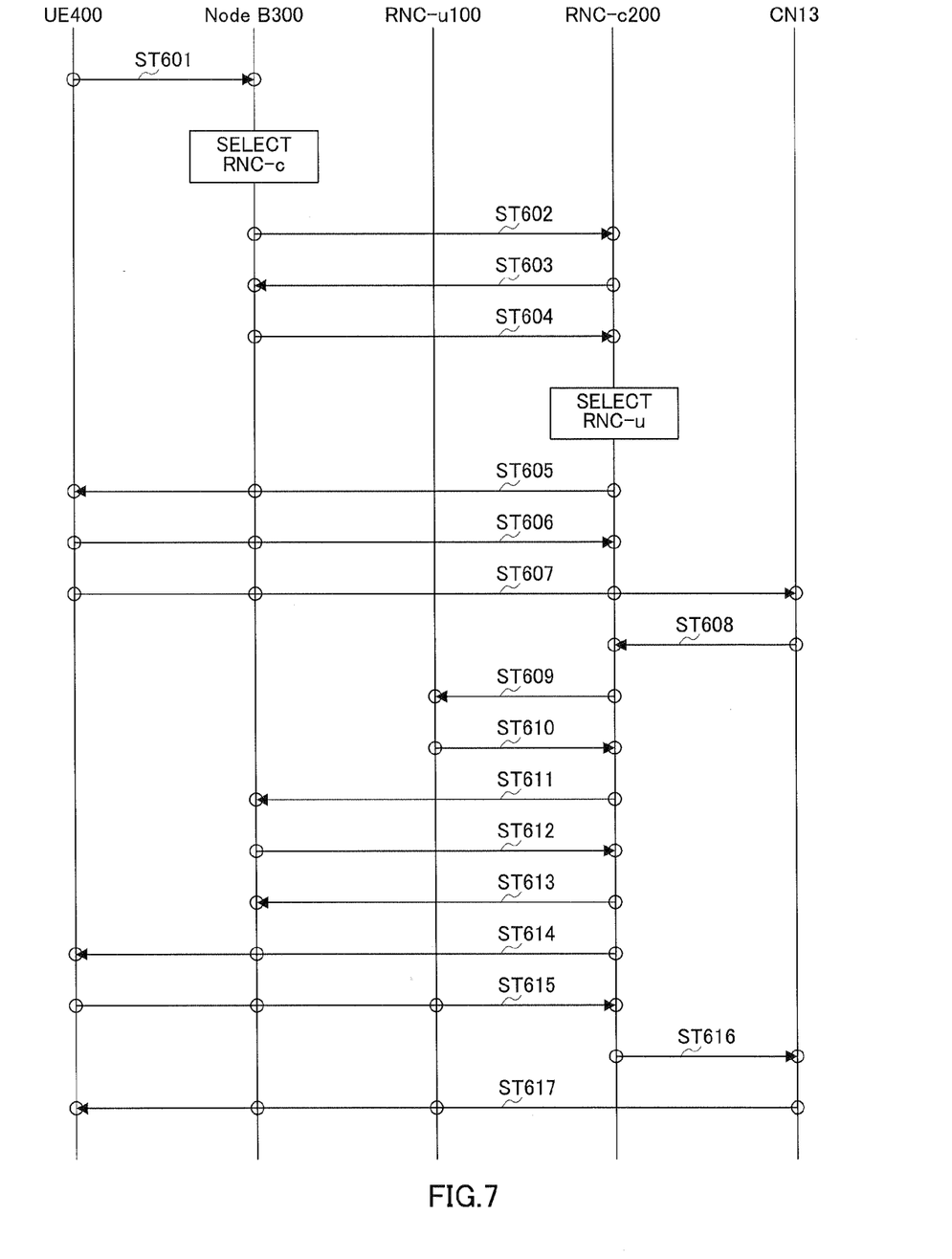
FIG. 7 is a sequence diagram showing the operation of RNC-c, RNC-c, Node B and UE, according to embodiment 1 of the present invention.

Next, the operation of RNC-u 100, RNC-c 200, Node B 300 and UE 400 will be described using FIG. 7. FIG. 7 is a sequence diagram showing the operation of RNC-u 100, RNC-c 200, Node B 300 and UE 400. The circle symbols in FIG. 7 show that the messages pass through the above-mentioned nodes.

First, UE 400 transmits an "RRC connection request" from PHY section 402 to PHY section 305 of Node B 300, to set up the RRC connection (step ST601). Next, control section 301 of Node B 300 selects RNC-c 200 for C-plane processing, based on the communication environment using, for example, information about MBMS data duplication process condition or information about the delay amount between Node B 300 and RNC-c 200.

Next, PHY section 305 of Node B 300 transmits the "RRC connection request" received from UE 400 to the selected RNC-c 200, via MAC processing section 304, RRC section 303, CRNCF section 302 and control section 301 (step ST602). Next, RNC-c 200, which received the "RRC connection request" at MAC-d section 204, transmits a "radio link setup request" from Node B control section 202 to Node B 300, via the public network, to set up a radio link for RRC connection (step ST603).

Next, Node B 300, which received the "radio link setup request" at control section 301, performs the radio link setup in Node B 300, and transmits a "radio link setup response" from control section 301 to RNC-c 200 (step ST604).

Next, in RNC-c 200, which has received the "radio link setup response" at Node B control section 202, SRNCF section 201 selects RNC-u 100 for U-plane processing, based on the communication environment, using, for example, information about the processing condition of RNC-u 100 or information about the delay amount between Node B 300 and RNC-u 100. Next, RNC-c 200 transmits a "RRC connection setup" from RRC section 206 to Node B 300, via SRNCF section 201 and Node B control section 202, to set up a radio link for RRC connection. Further, Node B 300, which received the "RRC connection setup" at control section 301, transmits the "RRC connection setup" from RRC section 303 to UE 400, via CRNCF section 302 (step ST605).

Next, UE 400 which received the "RRC connection setup" performs the radio link setup for RRC connection and transmits an "RRC connection setup complete" from RRC section 401 to Node B 300, via PHY section 402. Node B 300, which has received the "RRC Connection Setup Complete" at PHY section 305, transmits the "RRC Connection Setup Complete" via MAC processing section 304, RRC section 303, CRNCF section 302 and control section 301, to RNC-c 200, over the public network (step ST606).

Next, UE 400 transmits a "PDP context activation request" to Node B 300, to set up a bearer for receiving MBMS data. Node B 300 transmits the received "PDP context activation request" to RNC-c 200. RNC-c 200 transmits the received "PDP context activation request" from SRNCF section 201, to CN 13 (step ST607).

Next, RNC-c 200 receives a "RAB assignment request" to set up a bearer, from CN 13 (step ST608).

Then, RNC-c 200 transmits a "RAB setup", which is a notice regarding MBMS data duplication, from RNC-u control section 203 to RNC-u100, to set up a bearer between CN 13 and RNC-u 100 (step ST609). Thus, RNC-u 100 can recognize that RNC-u 100 itself is to duplicate MBMS data.

Next, RNC-u 100 performs a bearer setup between CN 13 and RNC-u 100, and transmits a "RAB setup complete" to RNC-c 200 (step ST610).

Next, RNC-c 200 transmits a "radio link reconfiguration prepare" from Node B control section 202 to Node B 300, to set up a bearer between RNC-u 100 and Node B 300, and set up a radio link between Node B 300 and UE 400 (step ST611).

Then, Node B300 performs the bearer setup between RNC-u 100 and Node B 300 and the radio link setup between Node B 300 and UE 400, and transmits a "radio link reconfiguration ready" from control section 301 to RNC-c 200 (step ST612).

Next, RNC-c 200 transmits a "radio link reconfiguration commit" from Node B control section 202 to Node B 300, to enact the bearer setup between RNC-u 100 and Node B 300 and enact radio link setup between Node B 300 and UE 400 (step ST613).

Then, RNC-c 200 transmits a "radio bearer setup" from Node B control section 202 to Node B 300, to set up a radio link between Node B 300 and UE 400, and Node B 300 transmits the received "radio bearer setup" from RRC section 303 to UE 400 (step ST614).

Next, UE 400 performs the radio link setup between Node B 300 and UE 400 to transmit a "radio bearer setup complete" from RRC section 401, and Node B 300 transmits the received "radio bearer setup complete" to RNC-u 100, via PHY section 305 and MAC processing section 304. Further, RNC-u 100 transmits the radio bearer setup complete to RNC-c 200, via MAC-d section 104, RLC section 103 and control section 101 (step ST615).

Next, RNC-c 200 transmits a "RAB assignment response" from SRNCF section 201 to CN 13 (step ST616).

Then, in RNC-u 100, PDCP section 102 receives MBMS data from CN 13, RLC section 103 duplicates the MBMS data, and MAC-d section 104 transmits the duplicated MBMS data to Node B 300. Then, Node B 300, which has received the MBMS data at MAC processing section 304, transmits the MBMS data to UE 400, via PHY section 305 (step ST617). In comparison to the conventional method, the present method introduces: a selection of selecting RNC-c 200, carried out by Node B 300, between step ST601 and step ST602; a selection step of selecting RNC-u 100, carried out by RNC-C 200, between step ST604 and step ST605; the "RAB setup step" of step ST609; and the "RAB setup complete" step of step ST610.

For example, it is possible to use RNC-u 100 as a company server and place Nodes B 300 in different rooms in the company, and establish connection between RNC-c 100 and Nodes B 300 by a local network such as company LAN.

Thus, according to embodiment 1, by dividing the functions of the RNC into RNC-u100 and RNC-c200, providing RNC-c 200 in an upper position than the public network, and providing RNC-u 100 in a lower position than the public network, RNC-u 100 is able to duplicate MBMS data and transmit duplicated MBMS data to Node B 300 by a local network, so that it is possible to prevent traffic increase in the public network and prevent increase in communication cost of the public network. Also, according to embodiment 1, part of the functions of the RNC is implemented in Node B 300 and Node B 300 selects RNC-c 200, and the RNC-c 200 selected by Node B 300 selects RNC-u 100, so that, as a result, Node B 200 can select RNC-u 100 having a small amount of processing or RNC-u 100 with a small delay amount, which can reduce the concentration of MBMS data duplication processes in a particular RNC-u 100.

EMBODIMENT 2

Figure 8:
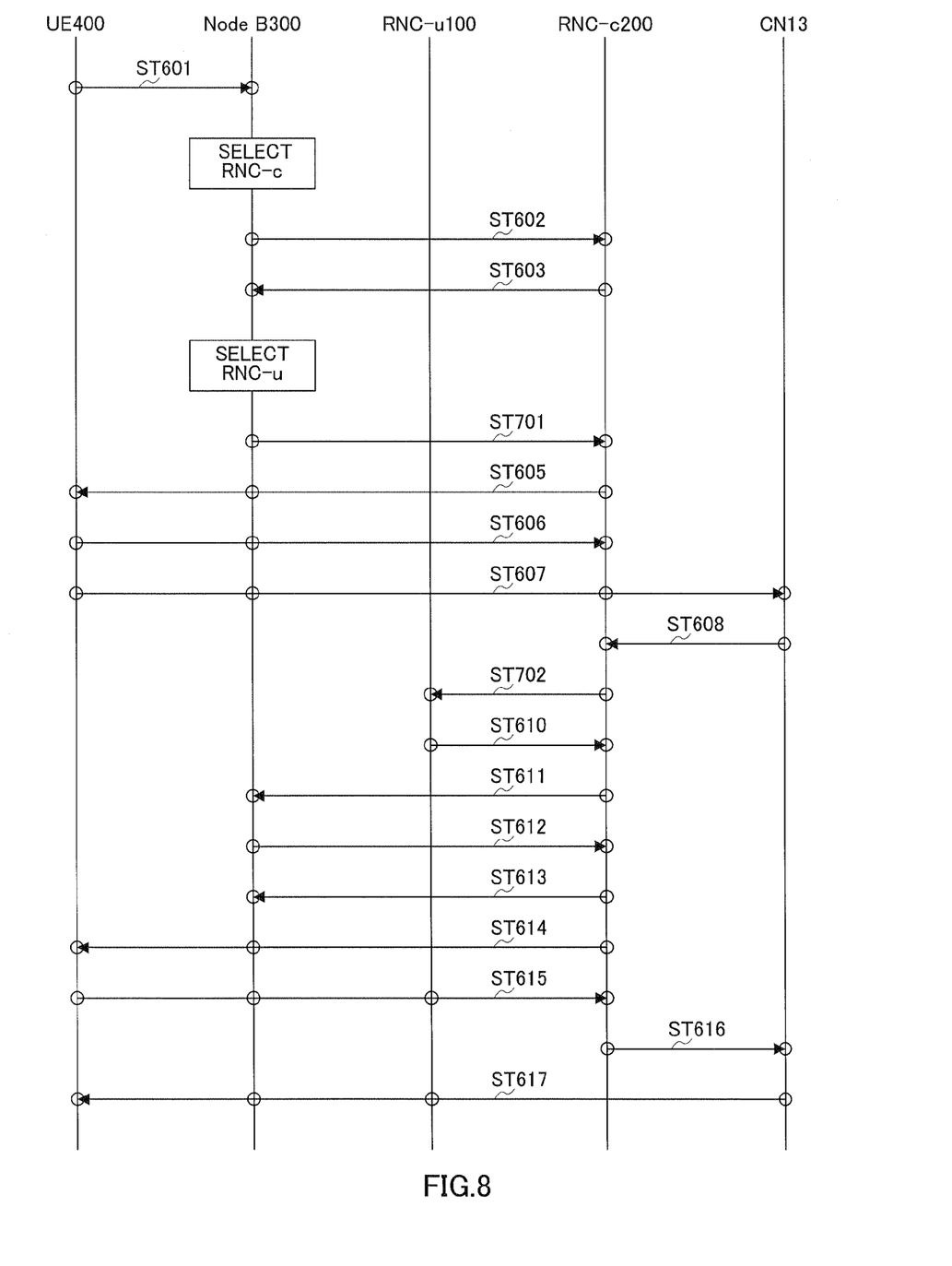
FIG. 8 is a sequence diagram showing the operation of RNC-u, RNC-c, Node B and UE, according to embodiment 2 of the present invention.

FIG. 8 is a sequence diagram showing the operation of RNC-u 100, RNC-c 200, Node B 300 and UE 400. The circle symbols of FIG. 8 show that the messages pass through the nodes. In embodiment 2, since the configuration of RNC-u 100 is the same as that shown in FIG. 2, the configuration of RNC-c 200 is the same as that shown in FIG. 3, the configuration of Node B 300 is the same as that shown in FIG. 4, and the configuration of UE 400 is the same as that shown in FIG. 5, description thereof is hereby omitted. Also, parts in FIG. 8, having the same operation as those shown in FIG. 7 are assigned the same reference numeral, and further description thereof is hereby omitted.

RNC-c 200, which has received a "RRC connection request" at Node B control section 202, transmits a "radio link setup request" from Node B control section 202 to Node B 300, via a public network, to set up a radio link for RRC connection (step ST603).

Next, control section 301 of Node B 300 selects RNC-u 100 for U-plane processing, based on the communication environment between Node B 300 and RNC-u 100.

Then, Node B 300 reports the selected RNC-u 100 to RNC 200 by transmitting information about the selected RNC-u 100 from control section 301 to RNC-c 200 (step ST701).

Next, in RNC-c 200, which has received a "radio link setup response" at Node B control section 202, SRNCF section 201 selects RNC-u 100 for U-plane processing. In this case, the RNC-u 100 selected by RNC-c 200 is the RNC-u 100 selected by Node B 300 and reported to RNC-c 200. Next, RNC-c 200 transmits a "RRC connection setup" from RRC section 206 to Node B 300, via SRNCF section 201 and Node B control section 202, to set up a radio link for RRC connection. Further, Node B 300, which has received the "RRC connection setup" at control section 301, transmits the "RRC connection setup" from RRC section 303 to UE 400, via CRNCF section 302 (step ST605).

Also, RNC-c 200 receives the "RAB assignment request" from CN 13, to set up a bearer (step ST608).

Next, RNC-c 200 transmits an "RAB Setup", which is a notice regarding duplication of MBMS data from RNC-u control section 203 to the RNC-u 100 reported from Node B 300 in step ST701, to set up a bearer between CN 13 and RNC-u 100 (step ST702) Thus, RNC-u 100 can recognize that RNC-u 100 itself is to duplicate MBMS data.

Next, RNC-u 100 performs the bearer setup between CN 13 and RNC-u 100, and transmits a "RAB setup complete", to RNC-c 200 (step ST610).

Then, the function distribution and the communication steps will be next described using FIG. 6. As shown in FIG. 6, MBMS data can be duplicated at RNC-u 100, and load can be shared between RNC-c 200 and between RNC-u 100. Specifically, the C-plane functions of the RNC are divided into SRNCF section 201 having a mobile terminal control function of performing control of the mobile terminal apparatus such as handover or the like, and CRNCF section 302 having a radio cell control function for performing radio cell setup for the terminal apparatus, release of the terminal apparatus from the radio cell and radio resource control, SRNCF section 201 is provided at RNC-c 200, and CRNCF section is provided at Node B 300. Also, the U-plane functions of the RNC are divided into PDCP section 102 and RLC section 103 having mobile terminal user functions for performing packet retransmission control for the terminal apparatus and access control for the dedicated radio channel occupied by the terminal apparatus, and MAC processing section 304 having radio cell user functions for performing access control for a common radio channel (for instance, FACH and HS-SDCH of HSDPA) shared by a plurality of terminal apparatuses, PDCP section 102 and RLC section 103 are provided in RNC-u 100, and MAC processing section 304 is provided at Node B 300. According to the radio cell user function, packet data to be sent to a plurality of terminal apparatuses through a common radio channel shared by a plurality of terminal apparatuses, is multiplexed in downlink, and packet data to be sent to each terminal apparatus is separated from the RACH which transmits packet data from the plurality of terminal apparatuses, in uplink.

Then, in addition to these function allocations, a step in which Node B 300 selects RNC-c 200 and Node B 300 selects RNC-u 100, is adopted. Also, it is possible to duplicate and distribute MBMS data at RNC-u 100 and disperse load between RNC-c 200 and between RNC-u 100. The MBMS data transmitted from CN 13 is received by RNC-u 100, via public network 502. Also, the MBMS data duplicated and transmitted by RNC-u 100 is received at Node B 300, via local network 506 between RNC-u 100 and each Node B 300.

Thus, according to embodiment 2, by dividing the RNC functions into RNC-u 100 and RNC-c 200, with RNC-c 200 being provided at a higher position than the public network and RNC-u 100 being provided at a lower position than the public network, and reallocating functions to apparatuses, RNC-u 100 is able to duplicate MBMS data and transmit duplicated MBMS data to Node B 300 via the local network, so that it is possible to prevent traffic increase in the public network and increase in communication cost in the public network. Also, according to embodiment 2, part of the RNC functions is implemented in Node B 300 and Node B 300 selects RNC-u 100, so that Node B 300 is able to select the RNC-u 100 with a small amount of processing or the RNC-u 100 with a small delay amount, and it is possible to reduce the concentration of MBMA data duplication processes in a particular RNC-u 100. Also, according to embodiment 2, when damage to RNC-c 200 occurs and it becomes necessary to shift the processes to a different RNC-c 200, it is sufficient that Node B selects a new RNC-c 200, without the need that the newly selected RNC-c 200 further reselects a new RNC-u 100, which makes it is possible to reduce the switching time to a new RNC-c 200.

The present application is based on Japanese Patent Application No. 2005-000607, filed on Jan. 5, 2005, the entire content of which is expressly incorporated by reference herein.

INDUSTRIAL APPLICABILITY

The communication apparatus, communication system and communication method of the present invention are useful in providing multicast packet communication services.

The invention claimed is:

1. A communication apparatus comprising:
a receiving section that receives packet data;
a duplicating section that duplicates the packet data in response to a signal instructing duplication of the packet data; and
a transmitting section that transmits the original packet data to a first base station apparatus and the duplicate packet data to another base station apparatus through a local network, wherein:
the signal instructing duplication is generated by the first base station apparatus, based on the communication environment between the communication apparatus and the first base station apparatus, and is communicated to the communication apparatus.

2. A communication apparatus comprising:
a receiving section that receives packet data;
a duplicating section that duplicates the packet data in response to a signal instructing duplication of the packet data; and
a transmitting section that transmits the original packet data to a first base station apparatus and the duplicate packet data to another base station apparatus through a local network, wherein:
the signal instructing duplication is generated by another communication apparatus, based on the communication environment between the other communication apparatus and the first base station apparatus, and is communicated to the communication apparatus.

3. A communication system comprising:
an upper station apparatus that duplicates packet data received via a public network and transmits the duplicated packet data by a local network;
a plurality of base station apparatuses that each receives an original or a duplicate of the packet data transmitted from the upper station apparatus and transmits the received packet data by a radio channel; and
a mobile terminal apparatus that receives the packet data transmitted from the base station apparatuses via the radio channel, wherein:
the upper station apparatus comprises a first upper station apparatus and a second upper station apparatus,
the first upper station apparatus, in response to being selected by one of the base station apparatuses, selects the second upper station apparatus based on a communication environment between the second upper station apparatus and the one of the base station apparatuses,
the second upper station apparatus selected by the first upper station apparatus duplicates the packet data received via the public network and transmits the duplicated packet data to the one of the base station apparatuses by the local network, and
the one of the base station apparatuses selects the first upper station apparatus based on a communication environment with the first upper station apparatus.

4. A communication system comprising:
an upper station apparatus that duplicates packet data received via a public network and transmits the duplicated packet data by a local network;
a plurality of base station apparatuses that each receives an original or a duplicate of the packet data transmitted from the upper station apparatus and transmits the received packet data by a radio channel; and
a mobile terminal apparatus that receives the packet data transmitted from the base station apparatuses via the radio channel, wherein:
the upper station apparatus comprises a first upper station apparatus and a second upper station apparatus,
the first upper station apparatus is selected by one of the base station apparatuses and transmits a notice regarding duplication of the packet data to the second upper station apparatus that is selected by the one of the base station apparatuses,
the second upper station apparatus duplicates the packet data upon receiving the notice and transmits the duplicated packet data to the one of the base station apparatuses by the local network, and
the one of the base station apparatuses selects the first upper station apparatus based on a communication environment with the first upper station apparatus and selects the second upper station apparatus based on a communication environment with the second upper station apparatus.

5. The communication system of claim 4, wherein:
the one of the base station apparatuses has a radio cell control function and a radio cell user function, the radio cell control function comprising a radio cell setup for a mobile terminal apparatus, a release of the mobile terminal apparatus from the radio cell, and a radio resource control, the radio cell user function comprising an access control for a common radio channel shared by a plurality of mobile terminal apparatuses,
the first upper station apparatus has a mobile terminal control function for performing a remote control for the mobile terminal apparatus, via the one of the base station apparatuses, and
the second upper station apparatus has a radio cell user function comprising a retransmission control for packet data for the mobile terminal apparatus and an access control for a dedicated radio channel occupied by the mobile terminal apparatus, via the one of the base station apparatuses.

6. A communication method comprising:
receiving, with a communication apparatus, packet data;
duplicating, with the communication apparatus, the packet data in response to a signal instructing duplication of the packet data; and
transmitting the original packet data from the communication apparatus to a first base station apparatus and the duplicate packet data from the communication apparatus to another base station apparatus through a local network, wherein:
the signal instructing duplication is generated by the first base station apparatus, based on the communication environment between the communication apparatus and the first base station apparatus, and is communicated to the communication apparatus.

* * * * *